Nov. 20, 1934.   A. W. WOODWARD   1,981,639
DUAL WHEEL
Filed July 14, 1931

Inventor
Alva W Woodward

By

Attorney

Patented Nov. 20, 1934

1,981,639

UNITED STATES PATENT OFFICE 1,981,639

DUAL WHEEL

Alva W. Woodward, Akron, Ohio, assignor to Wingfoot Corporation, Wilmington, Del., a corporation of Delaware Application July 14, 1931, Serial No. 550,650

3 Claims. (Cl. 301—13)

This invention relates to a dual wheel assembly, and more particularly to a wheel assembly which is readily adapted for mounting tires of different cross-sectional diameters.

One object of the invention is to provide a wheel assembly adapted to mount dual tires and rims wherein the axial distance between the spaced dual rims and tires can be changed as desired.

Another object of the invention is to provide a wheel assembly adapted to mount dual rims and tires wherein the assembly can be readily adapted to mount tires of different cross-sectional diameters.

Another object of the invention is to provide a wheel assembly adapted to mount dual rims in tires wherein the wheel felloe is provided with a plurailty of overlapping beveled seats formed on a similar angle, one of which seats is adapted to support one of the rims but which seat may be machined off or otherwise removed to allow the rim to seat on one of the remaining seats, thus providing a new spacing between the dual rims and tires.

The present trend in wheels and wheel assemblies is from higher pressure, small cross-sectional tires to lower pressure, and larger cross-sectional tires. The result of this change has been to render inoperative former types of wheel assemblies when it has been found desirable to mount tires of larger cross-sectional diameter upon such wheel assemblies. This occurs inasmuch as the larger cross-sectional diameter of the tires will either render it impossible to place tires in side-by-side relation upon the wheel felloe, or will cause them to be placed so closely together that it will be impossible for air to circulate between the tires, which circulating air normally serves to keep the tires at the proper temperature.

According to the present invention, a dual wheel assembly has been provided wherein the wheel felloe is formed with a plurality of overlapping, beveled seats, the uppermost of which is adapted to normally support one of the tire-carrying rims. If it is thereafter found necessary to space the dual rims and tires a greater distance apart, all that is necessary is to remove the uppermost beveled seat, which will allow the rim to seat upon the next lower seat, thus causing the tires to be spaced a greater distance apart.

For a better understanding of the invention, reference may now be had to the accompanying drawing, forming a part of the specification, wherein Fig. 1 is a cross-sectional view of a dual wheel assembly embodying the present invention;

Figure 1:
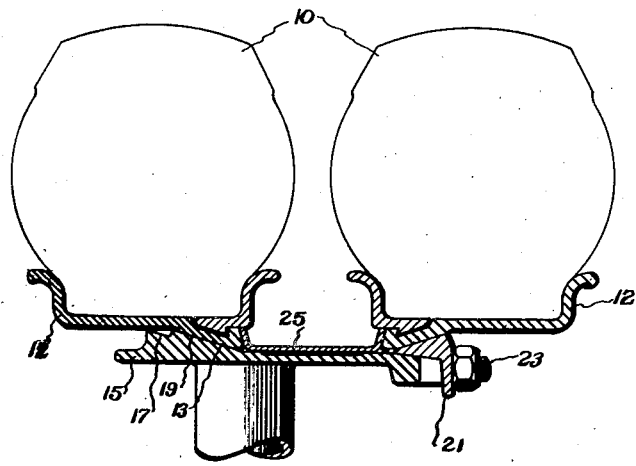
Figure 2:
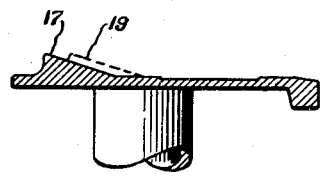
Fig. 2 is a cross-sectional view of the wheel felloe incorporated in the wheel assembly with the uppermost seat removed.

Referring to the drawing, the invention comprises a dual wheel assembly wherein a pair of tires 10, shown diagrammatically in Fig. 1, are mounted upon any desired type of rims 12, which rims are provided with suitable inner peripheral beveled portions 13. The rims 12 are mounted upon a wheel felloe 15, which is formed with a pair of overlapping beveled seats 17 and 19, the uppermost seat 19 being adapted to normally engage the beveled portion 13 on one of the rims 12 to support the rim. The seats 17 and 19 are preferably formed integral with the wheel felloe, as indicated in Fig. 2, and are of the same inclination so that it is possible to grind off the uppermost seat 19 to leave the beveled seat 17, which change has been indicated in Fig. 2. When this has been done, it will be seen that the portion 13 of the one rim 12 will seat upon the beveled seat 17 so that the rim 12 will be spaced a greater distance from the other rim 12.

The other rim 12 is adapted to be secured to the wheel felloe 15 by any desired means such as a clamp or clamping ring 21, which is secured to the wheel felloe by bolts 23. Suitable spacing means such as a ring 25, are provided on the wheel felloe between the rims 12, it being understood that a different width spacing band will be required when the beveled seat 19 is used than when the beveled seat 17 is used.

Figure 3:
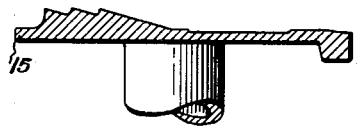
Fig. 3 is a view similar to Fig. 2 but of another form of the invention.

As illustrated in Fig. 3 the invention contemplates a construction wherein more than two overlapping beveled seats are provided on a single wheel felloe. The seats are three in number and are designated by the numerals 17, 19 and 29 although it will be apparent that more than three seats can be provided if desired. The operation of adapting the wheel assembly and felloe to increase the spacing between the dual rims and tires is similar to that described above with respect to the pair of overlapping beveled seats.

Figure 4:
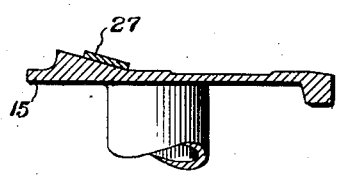
Fig. 4 is a view similar to Figs. 2 and 3 but of still another form of the invention.

While the invention has been described as comprising a wheel felloe having a plurality of overlapping beveled seats which are integral with the wheel felloe, it will be apparent that this construction can be modified within the scope of the invention. For example, as illustrated in Fig. 4, the uppermost seat may take the form of a ring 27 which normally lies between the next lower seat and the beveled portion 13 of one of the tire-supporting rims 12. In this form of the invention the ring seat 27 may be slid off the wheel felloe rather than ground off and may thereafter be replaced upon the wheel felloe if it is desired to change back to move the tires and rims closer together.

A plurality of ring seats 27 may be mounted on top of each other if it is desired to obtain a greater variation of adjustability.

It will be understood that the beveled seats 17 and 19 may be either upon the inboard or outboard portions of the wheel felloe but that they will normally be upon the inboard portion.

Moreover while the invention has been illustrated and described as including a continuous circumferential wheel felloe, it will be evident that the felloe may be dispensed with and the beveled seats provided directly on the ends of the wheel spokes or that the beveled seats may be provided on other similar modifications.

By the present invention a dual wheel assembly has been provided in which the axial spacing between the dual rims and tires may be readily increased with a minimum of time and expense. In this manner, tires of larger cross-sectional diameter may replace smaller cross-sectional tires without encountering any difficulties with regard to getting the tires on the wheel felloe or with respect to the proper cooling of the tires. It will thus be seen that a dual wheel assembly has been provided wherein the spacing between the rims and tires can be changed by laymen in the field without entailing a return of the assembly to the manufacture, and with a minimum of time and trouble.

Although I have illustrated only the preferred form which my invention may assume and have described that form in detail, it will be apparent to those skilled in the art that the invention is not so limited, but that various modifications may be made therein without departing from the spirit of the invention or from the scope of the appended claims.

What I claim is:

1. A wheel body having a periphery provided with an undulated surface comprising laterally spaced portions, similarly tapered axially, the inboard tapered portion terminating radially inwardly of the radially outermost end of the outboard tapered portion, whereby the inboard tapered portion serves as a guide to cutting the outboard portion until the tapers coincide.

2. A wheel member of the class described having a periphery provided with an undulated surface comprising laterally spaced portions which are similarly tapered axially, the inboard tapered portion terminating radially inwardly of the radially outermost end of the outboard tapered portion, said tapered portions being adapted selectively to form rim-mounting seats.

3. A wheel member of the class described comprising an annular body having a peripheral rim-seating portion formed with an axially tapered rim-receiving surface, said rim-seating portion being characterized by an axial length substantially greater than that of the rim-receiving surface, and means for indicating different axial positions at which the rim-receiving surface may be formed for different wheel-rim assemblies.

ALVA W. WOODWARD.